US011825825B1

(12) United States Patent
Rosher

(10) Patent No.: US 11,825,825 B1
(45) Date of Patent: Nov. 28, 2023

(54) ADJUSTABLE TENSION KITE HOLDING AND RELEASE RELEASE APPARATUS

(71) Applicant: R & R Tackle, Inc., Miami, FL (US)

(72) Inventor: Raymond A. Rosher, Miami, FL (US)

(73) Assignee: R & R Tackle, Inc., Miaim, FL (US)

( * ) Notice: Subject to any disclaimer, the term of this patent is extended or adjusted under 35 U.S.C. 154(b) by 0 days.

(21) Appl. No.: 17/229,471

(22) Filed: Apr. 13, 2021

(51) Int. Cl.
*A01K 97/00* (2006.01)
*A01K 91/047* (2006.01)
*B64C 31/06* (2020.01)

(52) U.S. Cl.
CPC ............ *A01K 97/00* (2013.01); *A01K 91/047* (2013.01); *B64C 31/06* (2013.01)

(58) Field of Classification Search
CPC ........ A01K 97/00; A01K 99/00; A01K 91/00; A01K 91/06; A01K 91/08; A01K 91/053; A01K 5/02; A01K 5/0225; A01K 5/0241; A01K 5/0258; A01K 1/10; G01F 11/10; G01F 11/28; B65H 57/14; B65H 2701/355
See application file for complete search history.

(56) References Cited

U.S. PATENT DOCUMENTS

| 3,816,954 | A | | 6/1974 | Bissonette | |
|---|---|---|---|---|---|
| 3,874,110 | A | * | 4/1975 | Larson | A01K 91/04 43/43.12 |
| 3,930,330 | A | * | 1/1976 | Black | A01K 97/12 43/17 |
| 4,212,127 | A | | 7/1980 | Daniels | |
| 4,611,423 | A | | 9/1986 | Rupp | |
| 5,564,214 | A | | 10/1996 | Tsurufuji | |
| 6,192,619 | B1 | | 2/2001 | Pirkle | |
| 10,856,537 | B1 | * | 12/2020 | Valerdi | A01K 91/08 |
| 10,881,092 | B2 | | 1/2021 | Rosher et al. | |
| 2018/0027790 | A1 | * | 1/2018 | Rosher | A01K 91/06 |

\* cited by examiner

*Primary Examiner* — Joshua J Michener
*Assistant Examiner* — Henry Hooper Mudd
(74) *Attorney, Agent, or Firm* — ALBERT BORDAS, P.A.

(57) ABSTRACT

An adjustable tension kite holding and release apparatus, which has an apparatus head, and an apparatus body having an adjustable thumbscrew coupled to the apparatus body, and first and second ring grippers having first and second bumps providing a ring gripping mechanism at a distal end of the apparatus body. The ring gripping mechanism holding a releasable ring, running a fishing line through the releasable ring, tightening the adjustable thumbscrew such that the ring gripping mechanism applies tension to the releasable ring, and increasing or decreasing the tension based on an estimated force desired to release the releasable ring.

1 Claim, 4 Drawing Sheets

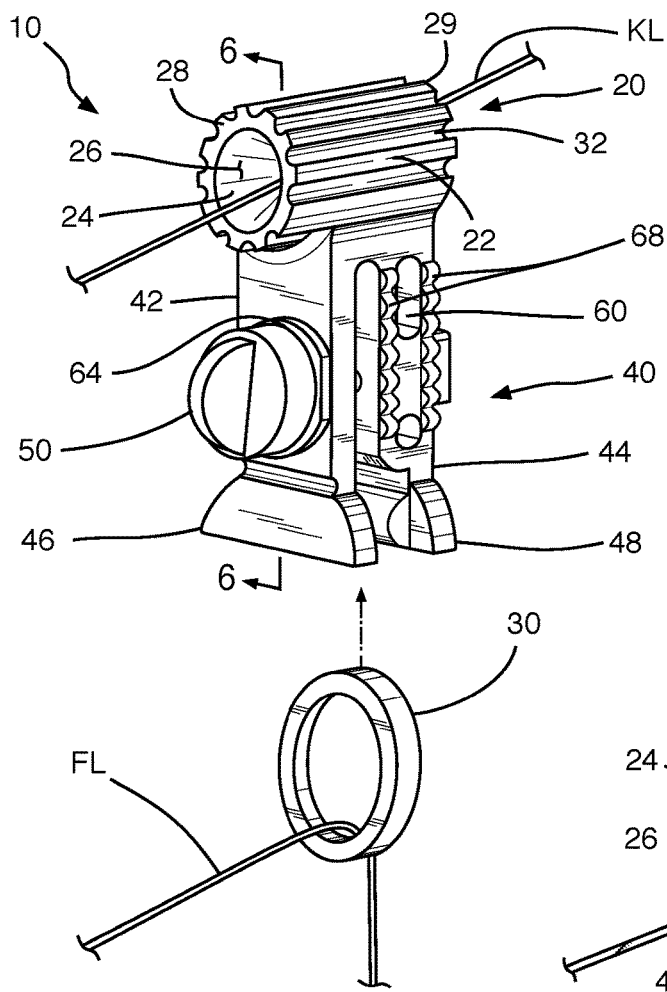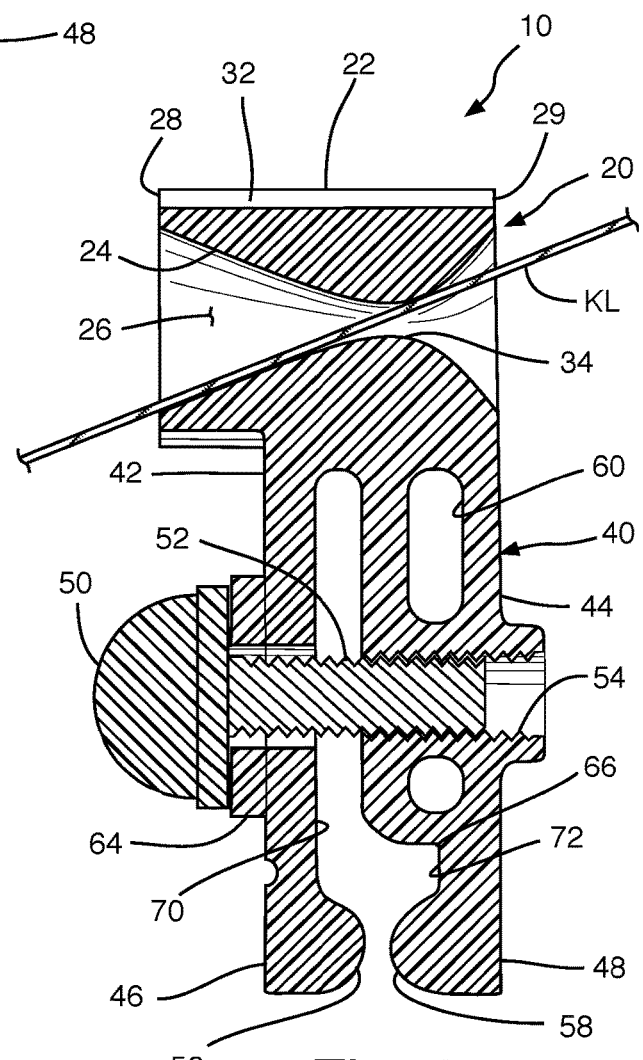

ADJUSTABLE TENSION KITE HOLDING AND RELEASE RELEASE APPARATUS

BACKGROUND OF THE INVENTION

1. Field of the Invention

The present invention relates to kite fishing, and more particularly, to an improved apparatus for optimizing kite fishing techniques.

2. Description of the Related Art

Kite fishing is a popular sport for catching large predatory fish, such as sailfish, kingfish, dolphin, marlin, bass and various other types of fish in a body of water such as an ocean or a river. This technique keeps the bait away from noise of a fishing vessel and close to the waters' surface, where the bait splashes the surface of the water, thus attracting target fish.

Applicant believes that one of the closest references corresponds to Applicant's own U.S. Pat. No. 10,881,092 B2 issued on Jan. 5, 2021 for Adjustable tension fishing line release apparatus. However, it differs from the present invention because Applicant teaches an offshore fishing apparatus that aligns properly, is light weight, and is consistently adjustable by the user to their desired tension for smooth release of their fishing line when a fish strikes or when any force overcomes the applied tension placed on the fishing line release arm. The device further includes a proximal beveled entry and exit including a pivot ball with an aperture, through which a kite or connection line is run through. The pivot ball allows the device to pivot in the direction the fishing line moves. The device is advantageously light weight, in part due to lightweight materials used to construct the device without reducing the device's performance.

Applicant believes that another reference corresponds to U.S. Pat. No. U.S. Pat. No. 5,564,214 issued to Tomoyoshi Tsurufuji on Oct. 15, 1996 for Inter-line fishing rod. However, it differs from the present invention because Tsurufuji teaches an inter-line fishing rod, which can hold annular fish line guide members positively on the inner surface of a rod tube. The inter-line fishing rod includes annular fish line guide members respectively mounted on the inner surface of a rod tube formed of fiber reinforced synthetic resin. The fishing rod is arranged such that minute projections are provided on the outer periphery of the fish line guide members facing the inner surface of the rod tube, and the minute projections are pressed against the rod tube inner surface.

Applicant believes that another reference corresponds to U.S. Pat. No. 4,212,127 issued to Dennis Daniels on Jul. 15, 1980 for Power plane for transporting fishing line. However, it differs from the present invention because Daniels teaches a carrier that move up and down a heavy downrigger or weight line by a hydrodynamic responsive plane the attitude of which is responsive to the presence or absence of a lightweight fishing line and lure attached to a trailing end of the carrier. Release of the fishing line trips the plane about an axis transverse to the carrier into an upward movement mode.

Applicant believes that another reference corresponds to U.S. Pat. No. 6,192,619 B1 issued to Fred L. Pirkle on Feb. 27, 2001 for Fisherman's release clip. However, it differs from the present invention because Pirkle teaches a fisherman's release clip that comprises a unitary molded clip body consisting of two parts. One part is an eye in the form of a snap hook having a resilient gate allowing it to be readily engaged with a line or cable but configured to prevent unintentional disengagement. The other part is a pair of fingers that are connected by a molded living hinge, and extend in side by side relationship. An adjusting screw is used to vary the spacing between the fingers, and gripper sleeves are removably fitted onto the fingers to grip a line extending between the sleeves. The release clip can be used in a variety of modes including outrigger, downrigger, flat line and kite fishing, and also in fishing utilizing hydrofoils, down planes, weights and floats.

Applicant believes that another reference corresponds to U.S. Pat. No. 3,816,954 issued to Kenton E. Bissonette on Jun. 18, 1974 for Free line down rigger release. However, it differs from the present invention because Bissonette teaches a down rigger release for clean line fishing and including a gripping or clamping element securable to a wet line at or above the position of the weight. The clamping means has jaws, which close on a bead element that normally slides freely up and down a lure line or fishing line and the bead, on insertion between the jaws in the gripping means, is releasably fixed in relation to the weight line. Upon fastening the bead element to the gripping element, several turns of lure line are made around the bead as by twisting the bead. On a strike or snag, the bead is jerked free of the gripping element and the turns in the line unwind so that the bead is freed to travel up and down the lure line and free from the weight line.

Applicant believes that another reference corresponds to U.S. Pat. No. 4,611,423 issued to Herbert E. Rupp on Sep. 16, 1986 for Outrigger clips. However, it differs from the present invention because Rupp teaches an outrigger clip for releasably holding a fishing line in trolling position astern a fishing boat has an elongated body with fastener members on each end for supporting the clip outboard of the boat on outrigger lines. A V-shaped roller over which the fishing line may freely run during trolling is rotatably retained on a shaft that extends laterally from a gate hinged on the midsection of the body about a pivot axis substantially parallel to the longitudinal axis of the body so the roller may swing between a closed, fishing line holding position and an opened, release position. A lug extends from the same side of the gate as the shaft at an acute angle. Detent members frictionally engage such lug when the roller is in the holding position and there are springs adjustably compressed in longitudinal bores in the body to apply pressure on the detent members for regulating the holding force applied to the lug to control the pull required to release the fishing line from the clip when a fish strikes.

Applicant believes that another reference corresponds to U.S. Pat. No. 3,930,330 issued to Albert David Black on Jan. 6, 1976 for Outrigger fishing line release clip. However, it differs from the present invention because Black teaches an outrigger clip for use in releasably securing a fishing line to the run-out line on an outrigger pole, the clip being constructed to reduce or eliminate fouling of the fishing line. The body and clip release arm are constructed so that the clip, when in use, will have a tendency to hang from the outrigger line instead of twisting, which causes fouling of the fishing line. The clip body itself is smooth about the edges so that any contact with a fishing line caused by slack or the like will prevent or prohibit snagging or fouling of the fishing line about the clip body itself. The clip includes a fishing line release arm with an adjustable tensioning means and an outrigger attaching wire disposed through the clip body at such a position to place the center of gravity of the body away from the attaching wire and the outrigger line.

Other patents describing the closest subject matter provide for a number of more or less complicated features that fail to solve the problem in an efficient and economical way. None of these patents suggest the novel features of the present invention.

SUMMARY OF THE INVENTION

The present invention is an adjustable tension kite holding and release apparatus, comprising an apparatus head and an apparatus body having first and second ring grippers, and an adjustable thumb screw.

The apparatus head comprises a beveled entry/exit with a neck, whereby a kite line runs therethrough. The apparatus head further comprises an exterior face, an interior face, and first and second head ends. The exterior face comprises peripheral grooves. Beveled entry/exit has a first predetermined diameter at the first and second head ends, and the neck comprises a second predetermined diameter, whereby the first predetermined diameter is larger than the second predetermined diameter. The neck is closer to the second head end than the first head end.

The apparatus body extends from the apparatus head defining first and second legs. The first and second legs comprise the first and second ring grippers, respectively at respective distal ends. The second leg comprises an aperture, a tab, and grips. The first and second ring grippers comprise first and second bumps respectively. First and second bumps extend at first and second interior sides, respectively. The first and second ring grippers are mirror image. Second interior side comprises a notch. The adjustable thumb screw comprises a male portion that is screwed into a female thread on the apparatus body. A releasable ring is positioned between the first and second ring grippers. A fishing line runs through the releasable ring. The first and second ring grippers provide a ring gripping mechanism holding the releasable ring, and the gripping mechanism being able to increase or decrease a tension on the releasable ring when the adjustable thumbscrew is tightened or loosened. The releasable ring is released into the water once a fish with the necessary force to overcome the tension on the releasable ring is caught. The kite line running through the beveled entry/ exit aligns the releasable ring approximately perpendicularly to the kite line.

It is therefore one of the main objects of the present invention to provide an adjustable tension kite holding and release apparatus.

It is another object of this invention to provide an adjustable tension kite holding and release apparatus, which aligns properly the fishing lines.

It is another object of this invention to provide an adjustable tension kite holding and release apparatus, which is light weight.

It is another object of this invention to provide an adjustable tension kite holding and release apparatus, which is consistently adjustable by the user to their desired tension for smooth release of the fishing line when a fish strikes or when any force overcomes the applied tension placed on the fishing line holding ring.

It is another object of this invention to provide an adjustable tension kite holding and release apparatus, in which lightweight materials are used to construct the device without reducing the device's performance.

It is another object of this invention to provide an adjustable tension kite holding and release apparatus that is volumetrically efficient for carrying, transporting, and storage.

It is another object of this invention to provide an adjustable tension kite holding and release apparatus, which is of a durable and reliable construction.

It is yet another object of this invention to provide an adjustable tension kite holding and release apparatus that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 5 is an isometric view of the present invention illustrating ring grippers in an open configuration and the ring detached.

FIG. 6 is a cut view taken along lines 6-6 from FIG. 5.

DETAILED DESCRIPTION OF THE PREFERRED EMBODIMENT

Figure 1:
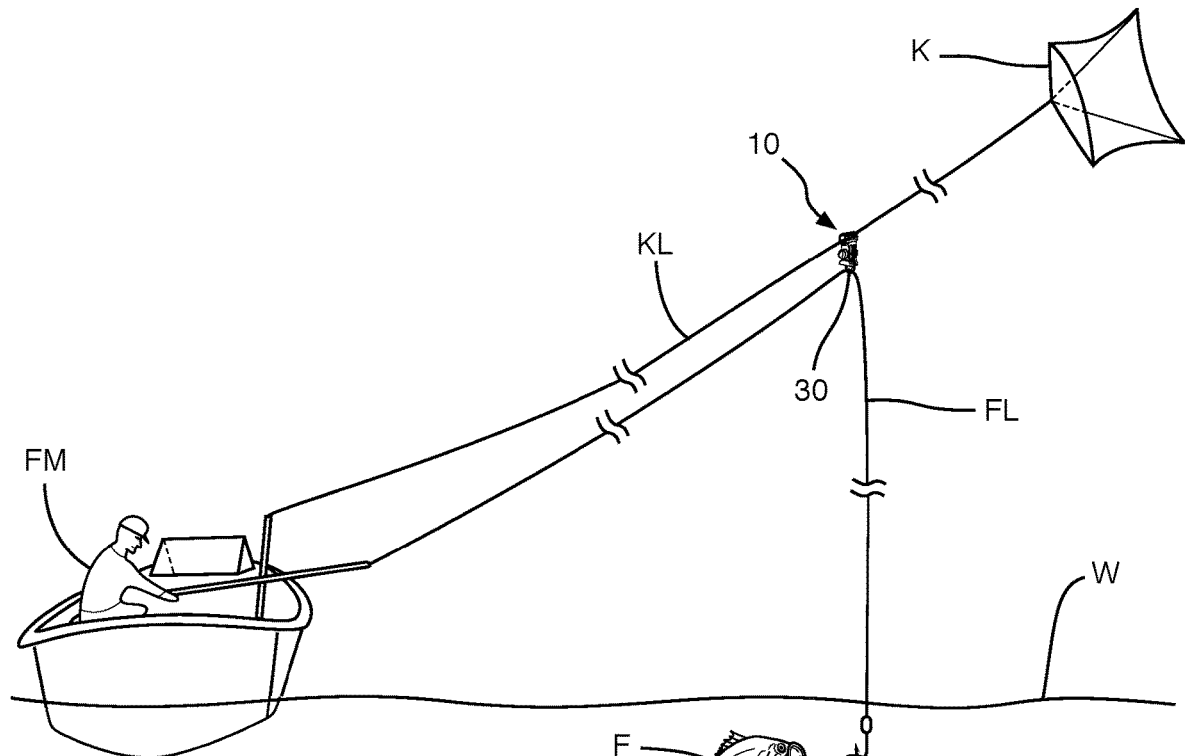
FIG. 1 is an isometric view of the present invention in use.

Referring now to the drawings, the present invention is an adjustable tension kite holding and release apparatus, and is generally referred to with numeral 10. It can be observed that it basically includes apparatus head 20 and apparatus body 40.

Figure 2:
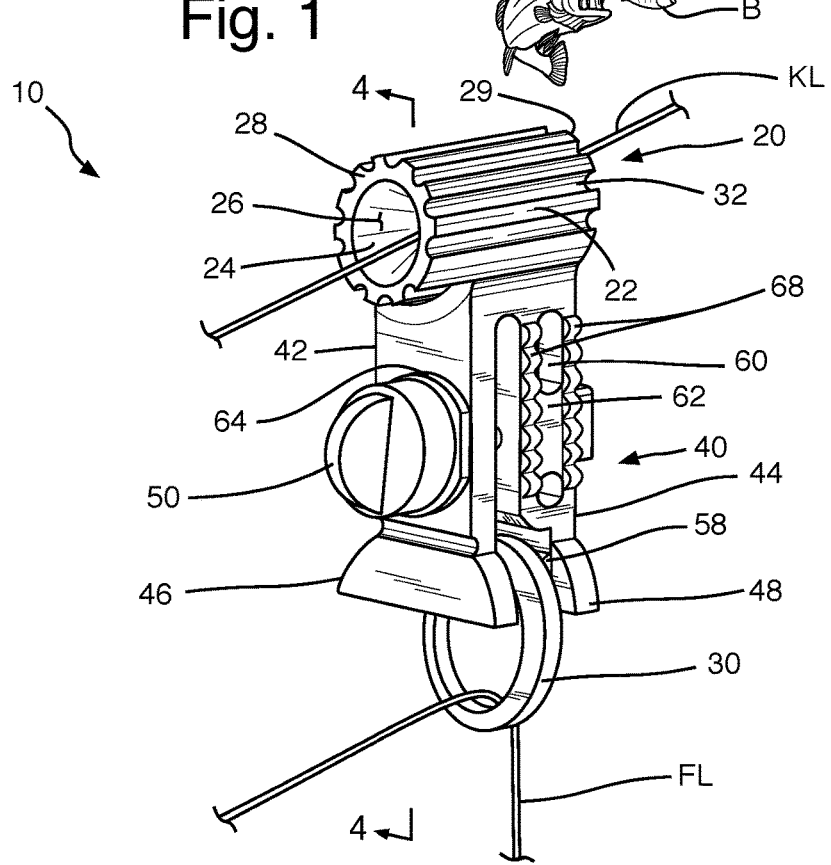
FIG. 2 is an isometric view of the present invention with a ring secured.

As seen in FIG. 1, present invention 10 is attached to kite line KL and fishing line FL. Kite K is attached to kite line KL and provides a lift necessary to keep bait B, live in a preferred embodiment, close to a surface of water W. Fishing line FL is dropped below the surface of water W to bait fish F. When live bait B is taken by fish F, a force releases fishing line FL from present invention 10 and kite line KL. Fisherman FM may then use a rod and reel to wind in fishing line FL. A plurality of fishing lines FL may be attached similarly to one or more additional apparatuses of present invention 10 and kite line KL. In a preferred embodiment, kite line KL runs through beveled entry/exit 26, as seen in FIG. 2. This action can align releasable ring 30 approximately perpendicularly to kite line KL. Releasable ring 30 is released into water W once fish F, with the necessary force to overcome a tension on releasable ring 30, is caught. Present invention 10 can be used by both right and left handed people. Further, present invention 10 is constructed of lightweight materials. The weight distribution on present invention 10 makes less likely to cause adverse stress on the fishing line FL or to tangle with fishing line FL.

Figures 3, 4:
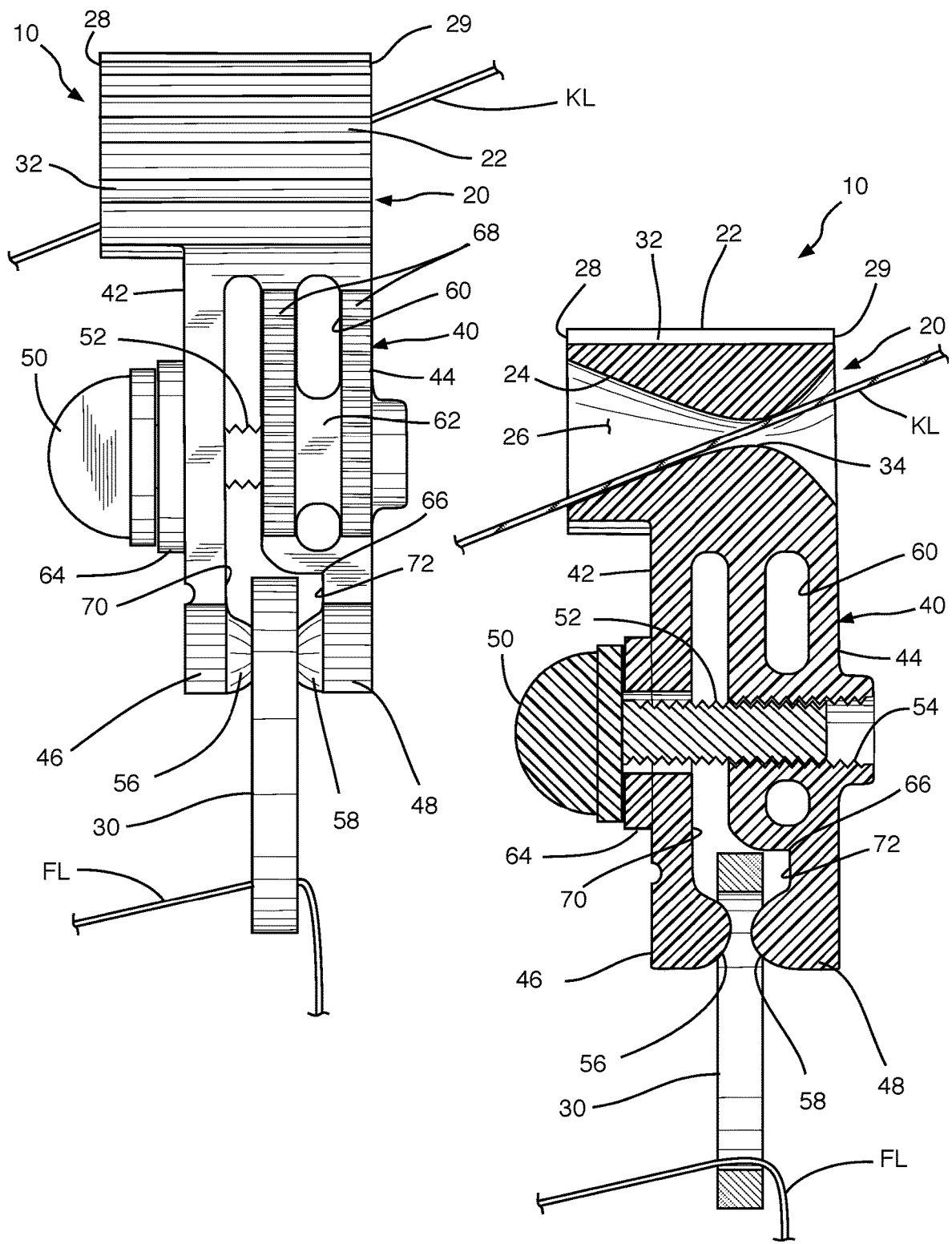
FIG. 3 is side view of the present invention with the ring secured.
FIG. 4 is a cut view of the present invention taken along lines 4-4 from FIG. 2.

As seen in FIG. 2, apparatus head 20 comprises exterior face 22, interior face 24, beveled entry/exit 26, first head end 28, and second head end 29. Exterior face 22 comprises peripheral grooves 32. Beveled entry/exit 26 comprises neck 34, as seen in FIG. 4. In an alternate embodiment, apparatus head 20 consists of exterior face 22, interior face 24, beveled entry/exit 26, first head end 28, and second head end 29. Exterior face 22 having peripheral grooves 32. Beveled entry/exit 26 has neck 34, as seen in FIG. 4. Apparatus body 40 extends from apparatus head 20 defining first leg 42 and second leg 44. Apparatus body 40 comprises first ring gripper 46, second ring gripper 48, and adjustable thumbscrew 50. In an alternate apparatus body 40 consists of first ring gripper 46, second ring gripper 48, and adjustable thumbscrew 50. First and second ring grippers 46 and 48 are at distal ends of first and second legs 42 and 44 respectively. In a preferred embodiment, first and second legs 42 and 44 are flared at a bottom on both sides in order for releasable ring 30 to be centered when fishing line FL is inserted.

As seen in FIGS. 3 and 4, first ring gripper 46 comprises first bump 56, and second ring gripper 48 comprise second bump 58. First bump 56 and second bump 58 extend at first interior side 70 and second interior side 72 respectively. First and second ring grippers 46 and 48 are mirror image. Second interior side 72 comprises notch 66. In an alternate embodiment, first ring gripper 46 consists of first bump 56, and second ring gripper 48 consists of second bump 58. First bump 56 and second bump 58 extend at first interior side 70 and second interior side 72 respectively. First and second ring grippers 46 and 48 are mirror image. Second interior side 72 consists of notch 66.

It is noted that when releasable ring 30 is secured onto apparatus body 40, in a preferred embodiment, a section of releasable ring 30 is positioned above first bump 56 and second bump 58, and adjacent to interior sides 70 and 72 as illustrated in FIG. 3. When adjustable thumbscrew 50 is tightened, it provides tension upon releasable ring 30, which contains fishing line FL. The tension can be adjusted as desired. The tension applied constricts releasable ring 30, but allows fishing line FL to retain a free range of motion through releasable ring 30. As sufficient pressure to overcome the tension setting is applied through fishing line FL, releasable ring 30 is released, and hence, the user's fishing line FL is also released smoothly and consistently. The tension applied to releasable ring 30 may be adjusted, and thus the force needed to overcome that tension based on the estimated force (or weight) of the desired fish F/bait B being used, as seen in FIG. 1. In one embodiment, the tension can range from 0 to approximately 17 pounds or more of necessary force to cause releasable ring 30 to release from present invention 10. In another embodiment, the maximum force measured is 25 pound.

As seen in FIG. 4, beveled entry/exit 26 has a first predetermined diameter at first and second head ends 28 and 29. Neck 34 comprises a second predetermined diameter. The first predetermined diameter is larger than the second predetermined diameter. The second predetermined diameter may vary. In a preferred embodiment, neck 34 of beveled entry/exit 26 is closer to second head end 29 than first head end 28, which secures kite line KL and compresses kite line KL causing friction to secure a better position.

In a preferred embodiment, beveled entry/exit 26 can range in diameter from about 0.060 up to about 0.320 inches, though sizes can vary. Beveled entry/exit 26 can allow for placement of an appropriately sized hole for varying sizes of stoppers used for multiple fishing line release apparatuses from a single kite line KL. In an alternative embodiment, beveled entry/exit 26 can be modified to run outrigger halyard materials and downrigger cables in place of a standard kite line KL. In another embodiment, present invention 10 can have various beveled entry/exit 26 dimensions to suit a desired application. In a preferred embodiment, the diameter of neck 34 is offered in sizes varying from 0.060 to 0.250 inches. This is for the various stoppers used for proper positioning along kite line KL.

As seen in FIGS. 5 and 6, adjustable thumbscrew 50 is coupled to apparatus body 40. Second leg 44 comprises aperture 60, tab 62 seen in FIG. 3, and grips 68. In an alternate embodiment, second leg 44 consists of aperture 60, tab 62 seen in FIG. 3, and grips 68. Releasable ring 30 is positioned between first and second ring grippers 46 and 48. Grips 68 allow holding present invention 10 in place, when inserting releasable ring 30 between ring grippers 46 and 48. A free moving fishing line FL runs through releasable ring 30. Releasable ring 30 is adapted to be releasable whenever a necessary tension is applied by fishing line FL. First ring gripper 46 and second ring gripper 48 provide a ring gripping mechanism on a distal end of present invention 10 holding releasable ring 30. The gripping mechanism being able to increase or decrease a tension on releasable ring 30 when adjustable thumbscrew 50 is tightened or loosened.

Figure 7:
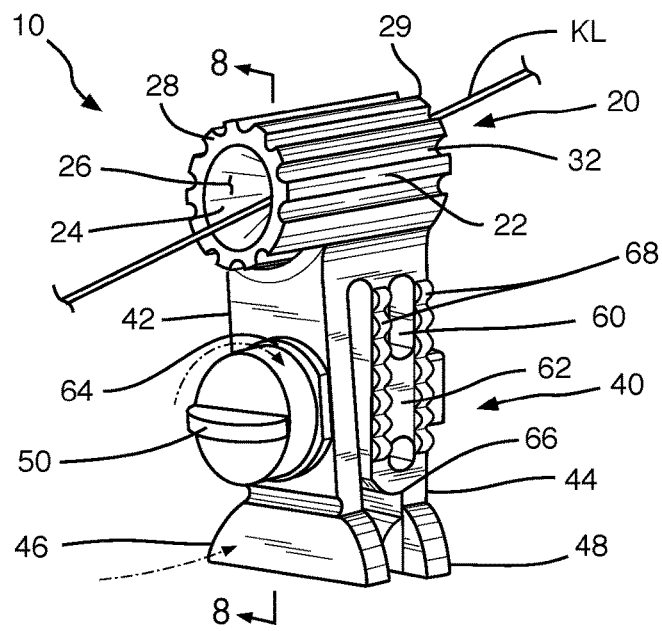
FIG. 7 is an isometric view of the present invention illustrating the ring grippers in a closing configuration.
Figure 8:
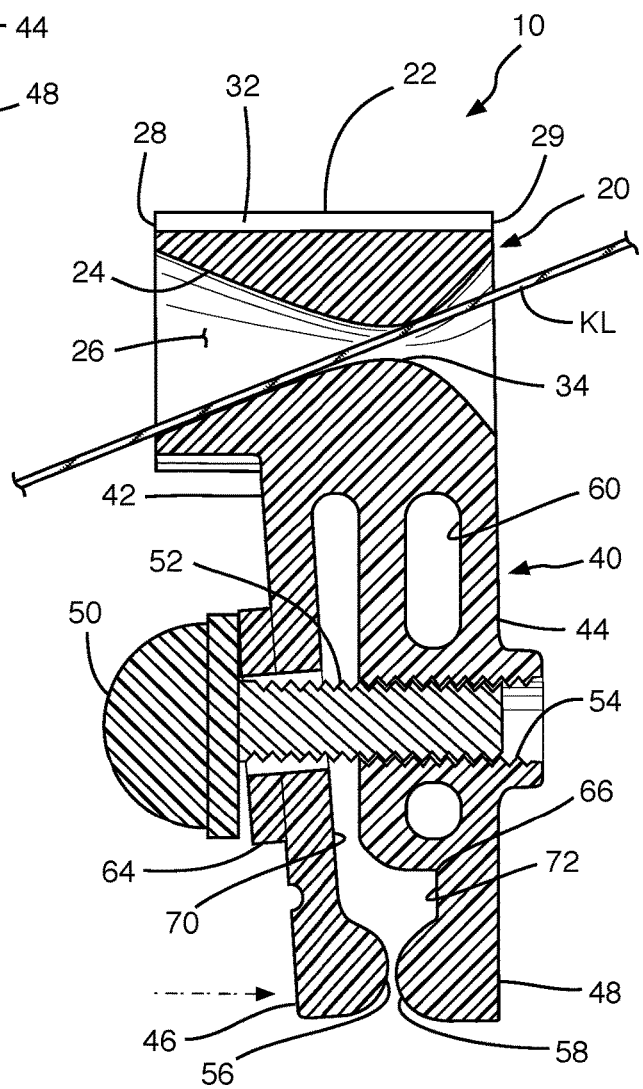
FIG. 8 is a cut view taken along lines 8-8 from FIG. 7.

As seen in FIGS. 7 and 8, adjustable thumbscrew 50 comprises male portion 52 that is screwed into female thread 54 on apparatus body 40. First leg 42 comprises protrusion 64 for a better adjustment of adjustable thumbscrew 50. In an alternate embodiment, adjustable thumbscrew 50 consists of male portion 52 that is screwed into female thread 54 on apparatus body 40. First leg 42 consists of protrusion 64 for a better adjustment of adjustable thumbscrew 50. When adjustable thumbscrew 50 is tightened, a distance between first bump 56 and second bump 58 decreases.

While the prior embodiments are designed for kite fishing, it should be understood that it could also be used in several fishing techniques where one wants a controlled release of their fishing line FL, seen in FIG. 1, from a remote location. Present invention 10 can be used with alternative offshore fishing devices such as outriggers, flat lines, or downrigger. All components of present invention 10 can be made using several techniques, including but not limited to plastic injection molding, 3 D printing, CNC machining, metal or plastic forming, stamping of various plastics or metals, or any other suitable method. Further, the components of present invention 10 can be made of several different materials or all the same material. In one embodiment, the components can be made of forged metals or sintering of various materials. In alternative embodiments, present invention 10 can be made using snap plastic injection connections instead of traditional securing hardware, such as screw, nuts or rivets. In another alternative embodiment, components can be epoxied, glued, ultrasonically bonded, welded or attached by any suitable means.

Present invention 10 therefore corrects for any angle of kite line KL in relation to the release arm or fishing line FL, when releasable ring 30 is not initially aligned for optimal performance. Present invention 10, having an optimal angle combined with a larger diameter for fishing line FL, reduces stress and friction on fishing line FL. Present invention 10 also help prevent fishing line FL from tangling, breaking, and allow for a smooth release. Present invention 10 also allow for specific tensions needed for fishing line FL release and is adjustable to an extent that is sufficient precise or consistent enough to facilitate optimal uses in varying kite fishing techniques. Present invention 10 also reduces overall weight as compared to prior devices that have an adverse effect on the varying kite fishing techniques, for example, during light wind conditions where weight is critical to proper fishing kite flight, and where multiple fishing line release arms are attached to a single kite line, which is attached to a single kite. Present invention 10 therefore is lightweight and allows proper alignment and adjustable tension of fishing line FL.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An adjustable tension kite holding and release apparatus, comprising:

A) an apparatus head comprising a beveled entry/exit with a neck, whereby a kite line runs directly therethrough, said beveled entry/exit has a first predetermined diameter at said first and second head ends and a second predetermined diameter at said neck, whereby said first predetermined diameter is larger than said second predetermined diameter, said neck is closer to said second head end than said first head end, said apparatus head further comprises an exterior face, an interior face, and first and second head ends, said exterior face comprises peripheral grooves; and B) an apparatus body, which comprises first and second ring grippers having first and second bumps respectively, and an adjustable thumbscrew, said adjustable thumbscrew comprises a male portion that is screwed into a female thread on said apparatus body, said apparatus body extends from said apparatus head defining first and second legs comprising said first and second ring grippers, respectively at respective distal ends, wherein said first and second ring grippers are a mirror image of each other, a releasable ring is positioned between said first and second ring grippers and a fishing line runs through said releasable ring, said second leg comprises an aperture, a tab, and grips, said first and second bumps extend from first and second interior sides respectively, said second interior side comprises a notch, said first and second ring grippers provide a ring gripping mechanism to secure said releasable ring, and said gripping mechanism being able to increase or decrease a tension on said releasable ring when said adjustable thumbscrew is tightened or loosened, said releasable ring is released into water once a fish with a necessary force to overcome a tension on said releasable ring is caught, and said kite line running through said beveled entry/exit aligns said releasable ring perpendicularly to said kite line.

* * * * *